United States Patent
Fisher

(10) Patent No.: US 11,157,447 B2
(45) Date of Patent: Oct. 26, 2021

(54) FILE SYSTEM SEARCH PROXYING

(71) Applicant: Rapid7, Inc., Boston, MA (US)

(72) Inventor: Tyler Fisher, Toronto (CA)

(73) Assignee: Rapid7, Inc., Boston, MA (US)

( * ) Notice: Subject to any disclaimer, the term of this patent is extended or adjusted under 35 U.S.C. 154(b) by 105 days.

(21) Appl. No.: 16/179,723

(22) Filed: Nov. 2, 2018

(65) Prior Publication Data

US 2020/0042614 A1    Feb. 6, 2020

Related U.S. Application Data

(60) Provisional application No. 62/714,716, filed on Aug. 5, 2018.

(51) Int. Cl.
*G06F 17/30*    (2006.01)
*G06F 16/14*    (2019.01)
*G06F 16/901*   (2019.01)

(52) U.S. Cl.
CPC .......... *G06F 16/148* (2019.01); *G06F 16/156* (2019.01); *G06F 16/9024* (2019.01)

(58) Field of Classification Search
CPC ......... G06F 17/30106; G06F 17/30958; G06F 17/30112; G06F 16/9024; G06F 16/156; G06F 16/148
See application file for complete search history.

(56) References Cited

U.S. PATENT DOCUMENTS

| | | | |
|---|---|---|---|
| 7,610,564 B1* | 10/2009 | Pfohe | G06F 3/0482 715/854 |
| 2010/0106712 A1* | 4/2010 | Mizutani | G06F 16/13 707/715 |
| 2011/0179075 A1* | 7/2011 | Kikuchi | G06F 21/6227 707/769 |
| 2011/0264635 A1* | 10/2011 | Yang | G06F 11/1402 707/695 |
| 2015/0261798 A1* | 9/2015 | Serlet | G06F 16/16 707/638 |
| 2016/0328488 A1* | 11/2016 | Lytle | G06F 16/252 |

(Continued)

OTHER PUBLICATIONS

Pontaza, Longest Common Substring, Oct. 13, 2017 https://github.com/pontazaricardo/Longest_common_substring/blob/master/README.md.*

(Continued)

*Primary Examiner* — Hosain T Alam
*Assistant Examiner* — Chongsuh Park
(74) *Attorney, Agent, or Firm* — Ashwin Anand

(57) ABSTRACT

Systems and methods for concurrently performing multiple searches of a file system based on a plurality of search requests. Each search request belonging to the plurality of search requests has a search root. A common set of search roots is identified from the plurality of search roots. A first window function is generated based upon a first search root belonging to the common set of search roots. Candidates located in a plurality of directory trees are enumerated. Each of the directory trees belonging to the plurality of directory trees begins in a search root in the common set of search roots. The candidates are evaluated based upon a first search criteria and the first window function. And, the candidates that satisfy both the first search criteria and the first window function are reported as a result.

20 Claims, 5 Drawing Sheets

(56) References Cited

U.S. PATENT DOCUMENTS

2017/0147621 A1\* 5/2017 De Smet ............. G06F 16/2255
2018/0137387 A1\* 5/2018 Lee ...................... G06K 9/6892

OTHER PUBLICATIONS

Pontaza, Longest Common Substring, Oct. 13, 2017 https://github.com/pontazaricardo/Longest_common_substring/blob/master/longest_common_string/longest_common_string/Program.cs.\*

Tutorialspoint, java.lang.String.replaceAll( ), Jul. 30, 2017 https://web.archive.org/web/20170730183006/https://www.tutorialspoint.com/java/lang/string_replaceall.htm.\*

Pontaza, Longest Common Substring, Oct. 13, 2017 https://github.com/pontazaricardo/Longest_common_substring/blob/master/README.md (Year: 2017).\*

Pontaza, Longest Common Substring, Oct. 13, 2017 https://github.com/pontazaricardo/Longest_common_substring/blob/master/longest_common_string/longest_common_string/Program.cs (Year: 2017).\*

Tutorialspoint, java.lang.String.replaceAll( ), Jul. 30, 2017 https://web.archive.org/web/20170730183006/https://www.tutorialspoint.com/java/lang/string_replaceall.htm (Year: 2017).\*

\* cited by examiner

FILE SYSTEM SEARCH PROXYING

CROSS-REFERENCE TO RELATED APPLICATIONS

The present application claims the benefit of U.S. provisional application No. 62/714,716, filed on Aug. 15, 2018, the entire disclosure of which is incorporated by reference as if set forth in its entirety herein.

TECHNICAL FIELD

This invention generally relates to systems and methods for file system searching and, more particularly but not exclusively, to systems and methods for concurrently performing multiple searches of one or more file systems.

BACKGROUND

Generally, an endpoint is a device communicative over a network. Many known vulnerabilities exist, which when present on an endpoint can be exploited to allow for unauthorized access to a network. In many cases, endpoints (e.g., laptops) are used and maintained primarily by end users and not information technology (IT) professionals. Endpoints therefore present a risk as a likely source of unauthorized access to a network.

To combat this risk, security experts often perform multiple searches of an endpoint's file system, directing each individual search to one of many known vulnerabilities. Typically, a single file system search requires traversal of at least a large portion of the file system being searched and, as a result, is typically resource intensive and time consuming. When multiple searches are performed on the same file system, the entire file system is likely to be traversed multiple times.

Therefore, searching for multiple vulnerabilities on a single endpoint is resource intensive, time consuming and costly. As a single network will have many endpoints these costs are amplified, such that adequately searching all endpoints on a network for all known vulnerabilities is often impractical.

Therefore, systems and methods that perform multiple file system searches with fewer resources and in less time are needed in order to more efficiently identify endpoint vulnerabilities and better prevent unauthorized access to secured networks.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for concurrent performance of multiple file system searches. The method includes receiving a plurality of search requests, each search request comprising at least one search root; identifying, using a configured processor, a common set of search roots from the plurality of search roots; generating, using the configured processor, a first window function based on a first search root belonging to the common set of search roots; enumerating, using the configured processor, candidates located in a plurality of directory trees, each directory tree beginning in a search root in the common set of search roots; evaluating, using the configured processor, the candidates based upon a first search criteria and the first window function; and reporting, using the configured processor, a result from the candidates that satisfies both the first search criteria and the first window function.

In some embodiments of the method, the method additionally includes identifying, using the configured processor, a non-common search root not belonging to the common set of search roots; enumerating, using the configured processor, non-common candidates located in a directory tree beginning in the non-common search root; evaluating, using the configured processor, the non-common candidates based upon a second search criteria; and reporting, using the configured processor, a second result from the non-common candidates that satisfies the second search criteria.

In some embodiments of the method, the common set of search roots comprises at least one search root that shares a common ascending node or a common descending node.

In some embodiments of the method, the first window function comprises a pair of directed acyclic word graphs (DAWGs).

In some embodiments of the method, the pair of DAWGs include a blacklist DAWG defining excluded nodes, and a whitelist DAWG that defines a set of search roots.

In some embodiments of the method, the method additionally includes evaluating, using the configured processor, the candidates against the blacklist DAWG; and evaluating, using the configured processor, the candidates against the whitelist DAWG.

In some embodiments of the method, reporting the result includes executing at least one of a callback handler and an asymmetric coroutine.

In some embodiments of the method, each search request additionally includes a set of directory exclusions and the method additionally includes computing the intersection of the plurality of sets of directory exclusions; and enumerating, using the configured processor, candidates located in the common set of search roots and not located in the computed intersection of the plurality of sets of directory exclusions.

In some embodiments of the method, identifying the common set of search roots includes removing interleaving search roots.

In some embodiments of the method, each search request further comprises a set of directory exclusions, and identifying the common set of search roots comprises removing search roots that are descendent nodes of a directory exclusion.

In another aspect, embodiments relate to a system for concurrent performance of multiple file system searches. The system includes a configured processor. The configured processor is configured to receive a plurality of search requests, each search request comprising at least one search root; identify a common set of search roots from the plurality of search roots, generate a first window function based on a first search root belonging to the common set of search roots; enumerate candidates located in a plurality of directory trees, each directory tree beginning in a search root in the common set of search roots; evaluate the candidates based upon a first search criteria and the first window function; and report a result from the candidates that satisfies both the first search criteria and the first window function.

In some embodiments of the system, the configured processor is additionally configured to identify a non-common search root not belonging to the common set of search roots; enumerate the non-common candidates based upon a second search criteria; and report a second result from the non-common candidates that satisfies the second search criteria.

In some embodiments of the system, the common set of search roots comprises at least one search root that shares a common ascending node or a common descending node.

In some embodiments of the system, the first window function comprises a pair of directed acyclic word graphs (DAWGs).

In some embodiments of the system, the pair of DAWGs include a blacklist DAWG defining excluded nodes, and a whitelist DAWG defining a set of search roots.

In some embodiments of the system, the configured processor is additionally configured to evaluate candidates against the blacklist DAWG; and evaluate candidates against the whitelist DAWG.

In some embodiments of the system, the configured processor is configured to report the result in part by configurations to execute at least one of a callback handler and an asymmetric coroutine.

In some embodiments of the system, each search request additionally includes a set of directory exclusions and the configured processor is additionally configured to compute the intersection of the plurality of directory exclusions; and enumerate candidates located in the common set of search roots and not located in the computed intersection of the plurality of sets of directory exclusions.

In some embodiments of the system, the configured processor is configured to identify the common set of search roots in part by configurations to remove interleaving search roots.

In some embodiments of the system, each search request additionally includes a set of directory exclusions and the configured processor is configured to identify the common set of search roots in part by configurations to remove search roots that are descendant nodes of a directory exclusion from the common set of search roots.

In yet another aspect, some embodiments relate to a non-transitory computer readable media storing instructions that are executable by a processing device. Upon execution of the instructions, the processing device performs operations that include receiving a plurality of search requests, each search request comprising at least one search root; identifying a common set of search roots from the plurality of search roots; generating a first window function based on a first search root belonging to the common set of search roots; enumerating candidates located in a plurality of directory trees, each directory tree beginning in a search root in the common set of search roots; evaluating the candidates based upon a first search criteria and the first window function; and reporting a result from the candidates that satisfies both the first search criteria and the first window function.

In some embodiments of the non-transitory computer readable media storing instructions that are executable by a processing device, the operations additionally include identifying a non-common search root not belonging to the common set of search roots; enumerating non-common candidates located in a directory tree beginning in the non-common search root; evaluating the non-common candidates based upon a second search criteria; and reporting a second result from the non-common candidates that satisfies the second search criteria.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
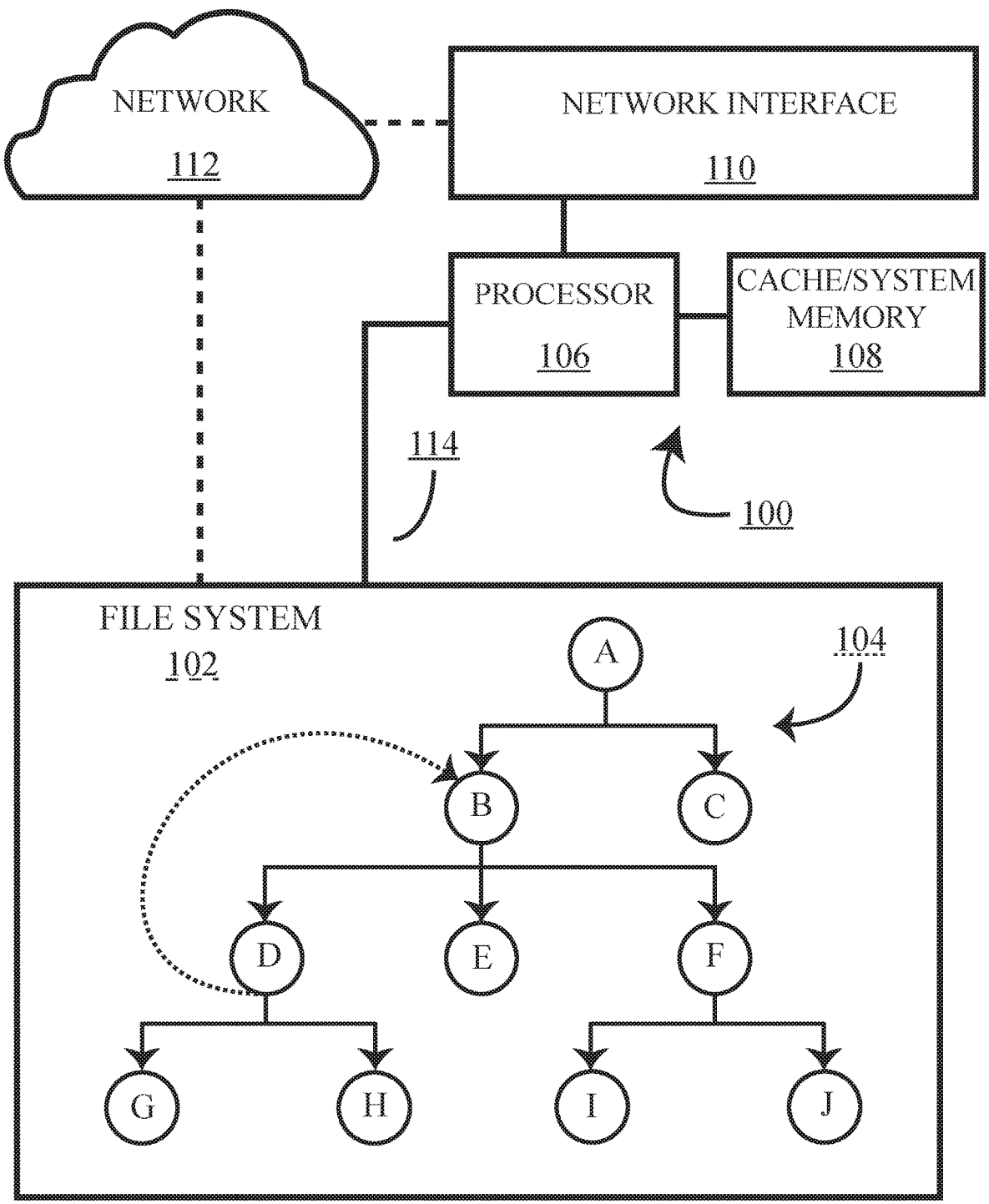
FIG. 1 illustrates a sample file system search proxying system (FSSP) in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

FIG. 1 illustrates a file system search proxying (FSSP) system 100 according to some embodiments. The FSSP system 100 performs multiple file system searches concurrently upon a file system 102. The file system 102 is shown in FIG. 1 with an exemplary directory tree 104. The FSSP system 100 comprises a processor 106 configured to concurrently perform multiple searches of a file system 102. According to some embodiments, the FSSP system 100 further comprises system memory or cache 108. A network interface 110 is present in some embodiments of the FSSP system 100. According to some embodiments, the network interface 110 allows for remote communication between the processor 106 and the file system 102, by way of one or more networks 112. According to some embodiments, the processor 106 is local to the file system 102 and local communication is provided by a system bus 114. The FSSP system 100 has been designed to perform a plurality of searches concurrently on a file system and, according to some embodiments, within a single process or a single thread. In order to explain how the FSSP system 100 can improve search efficiency a brief description of the state of the art in file searching follows.

Presently, file system searches are performed independently. Examples of presently available programs for performing file system searches in this manner include GNU Find for Linux operating systems and BSD Find for macOS Platforms. Presently performing a plurality of searches on a file system requires each of the searches be performed sequentially or by way of multiple processes or threads. Whether the plurality of searches are performed one at a time or through multiple processes in parallel the plurality of independent searches necessarily requires repeated and redundant traversal of the file system. It is common for millions and even billions of extraneous function calls to be performed as a result of this inefficient search strategy.

Figure 2:
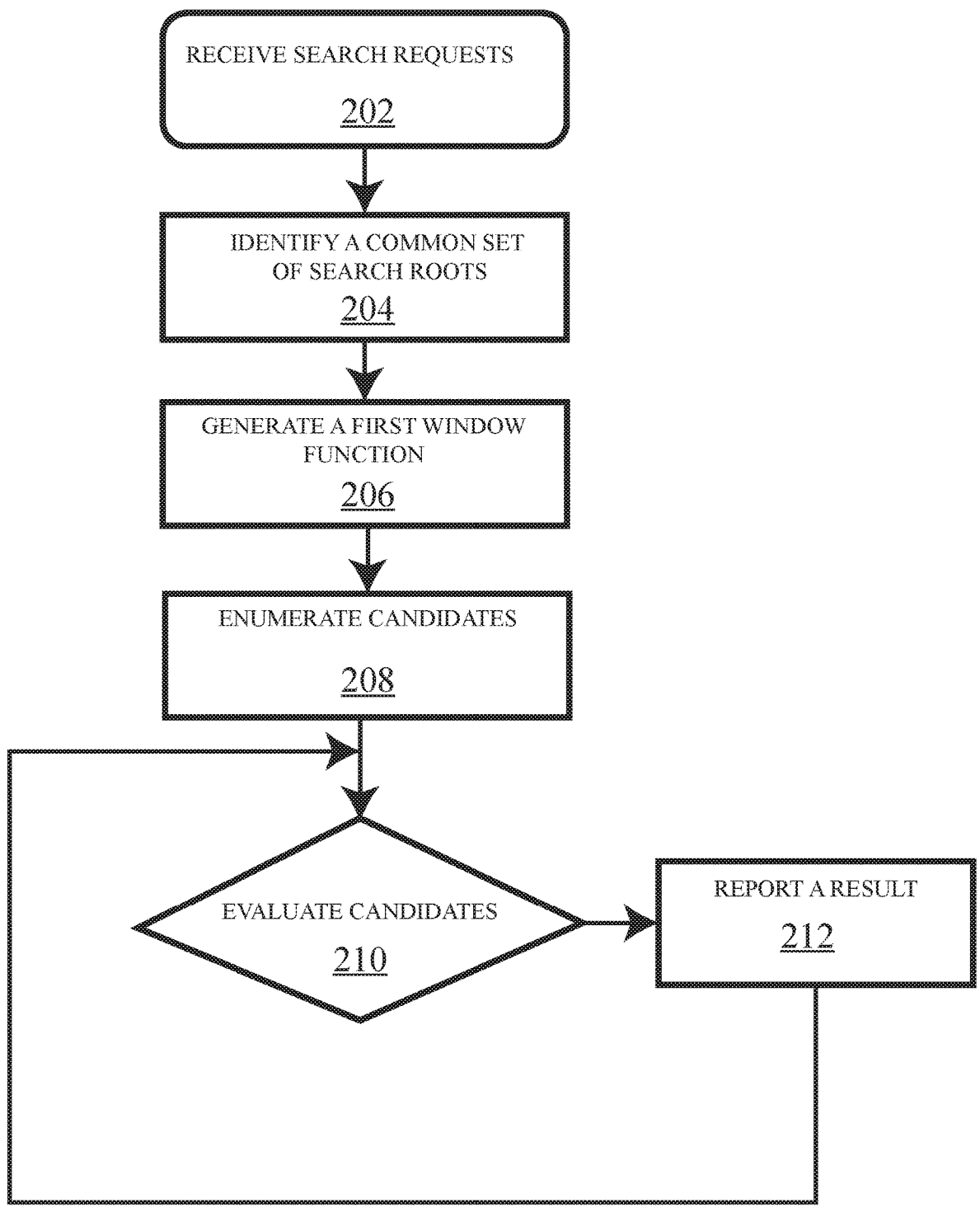
FIG. 2 presents a flowchart of a method for concurrently performing multiple file system searches in accordance with one embodiment.

Operation of the FSSP system 100 according to some embodiments is represented by way of a flow chart in FIG. 2. First, a plurality of search requests are received 202. According to some embodiments, each search request comprises at least one search root and a search criteria. Generally, the search criteria may be thought of as "what is being searched for" and the search root may be understood as "where the search is to be conducted." According to some embodiments, the plurality of search requests is received by way of a user interface or a network interface.

From the plurality of search roots a common set of search roots is identified 204. Generally, the common set of search roots may be thought of as "where the proxy search will be conducted." The common set of search roots therefore subsumes at least one search root from the plurality of search requests. The common set of search roots in some versions subsumes interleaving search roots. Search roots are said to be interleaving if they comprise one or more ascendant or descendent node. Reduction of interleaving search roots to a common search root is explained by way of example below. A set of search roots comprises a first search root, which is '/opt/' and a second search root, which is '/'. The first search root and the second search root are interleaving. And, a common set of search roots may be reduced down to just one common search root, the second search root '/', because the first search root '/opt/' is a subdirectory of '/'. According to some embodiments, the common set of search roots subsumes a union of each of the interleaving search roots from the plurality of search requests. According to some embodiments, some or all of the search roots belonging to the plurality of search roots comprise one or more directory exclusions. The directory exclusions are roots, which may belong to the search root, but which are not to be searched according to the search request. According to some embodiments, the common set of search roots does not subsume directory exclusions that are common between overlapping search roots. Identification of a common set of search roots 204 is further clarified below.

Once a common set of search roots is identified 204, a first window function is then generated 206. The first window function describes a first search root that belongs to the set of common search roots. According to some embodiments, the first window function comprises a pair of directed acyclic word graphs (DAWGs). The pair of DAWGs comprises a whitelist DAWG and a blacklist DAWG. The whitelist DAWG describes the first search root and the blacklist DAWG describes a first directory exclusion belonging to the first search root. A DAWG is a specialized type of Deterministic Acyclic Finite State Automation (DAFSA) that represents a set of strings and allows for a query operation that can efficiently test whether a given string belongs to the set of strings.

Candidates located within a plurality of directory trees contained in the common set of search roots are then enumerated 208. Generally, all of the interleaved search roots belonging to the plurality of search requests are enumerated only once during this process. This improves search efficiency over presently available search methods, which require some candidates to be enumerated repeatedly where search requests are directed toward partially overlapping (i.e., interleaving) search roots. According to some embodiments, each directory tree begins at a search root belonging to the common set of search roots. General examples of candidates include files, directories, metadata, links, and utilities. In some embodiments, the candidates are enumerated by listing each file-name and/or path associated with each candidate. According to some other embodiments, a plurality of candidates is enumerated 208 with each candidate having one or more attributes that are also enumerated. The attributes being enumerated are in some cases based upon one or more search criteria from the plurality of search requests. Candidate attributes useful to vulnerability searching on network endpoints are access right flags, such as setuid (SUID) and setgid (SGID). Both SGID and SUID are bit value attributes of a candidate file that when set (i.e., set to 1) allow the file to be executed with elevated permissions (e.g. as a super user or root, or as a group). The attributes generally can be any information associated with the candidate and tracked by the file system. Some particular examples of candidate attributes include entry type (e.g., regular file, block special file, character special file, directory, symbolic link, FIFO, socket link, etc.), owner permissions, group permissions, other permissions, number of links, owner, group, size in bytes, time of last modification, and path name. According to some embodiments, enumerating the candidates includes listing all contents located within all of the search roots belonging to the common set of search roots and all candidate attributes required by any of the plurality of search criteria.

Once a candidate is enumerated, it may then be evaluated 210. The candidates are evaluated 210 based upon one or more windowing functions (e.g., the first windowing function) and one or more search criteria (e.g., a first search criteria). The enumerated candidates comprise candidates from multiple search roots (i.e., proxy search). The windowing functions demultiplex the candidates. According to some embodiments, evaluating the candidates 210 with the windowing function constructs an inverse mapping between an individual candidate and the one or more search requests that are directed toward a search root containing the individual candidate. Once the individual candidate is mapped to a search request, it may be evaluated 210 according to a search criteria belonging to the search request. According to some embodiments, evaluation of the candidates includes using a plurality of evaluation layers. Each evaluation layer which typically contains search criteria for a single search request is associated with a windowing function. According to some embodiments, the plurality of evaluation layers includes stateless evaluation layers. In some versions, the plurality of evaluations may be evaluated independently of the plurality of windowing functions.

Finally, candidates which satisfy both a search criteria and its windowing function are reported as a result 212. According to some embodiments, the result is reported 212 by means of an asymmetric coroutine. The use of asymmetric coroutines in some versions allows the FSSP system 100 to perform multiple searches in a single processing thread. Single-threaded FSSP allows for multiple searches to be performed concurrently and independently of one another.

Figure 3A:
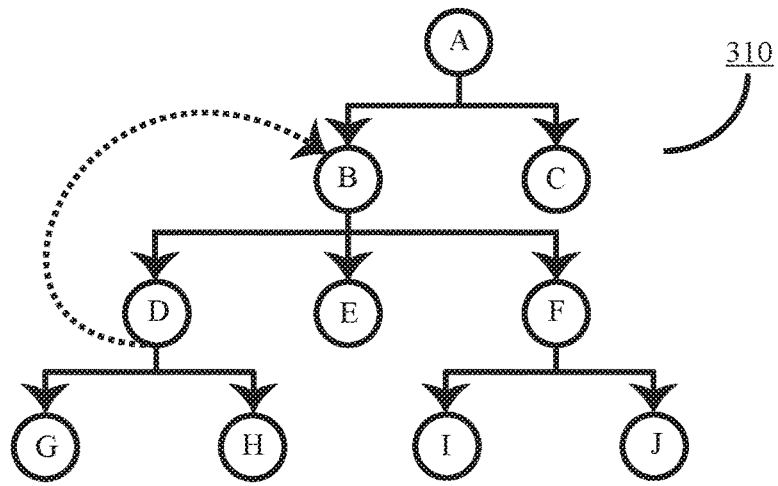
FIG. 3A illustrates an exemplary file system over which multiple file system searches are performed in accordance with one embodiment.
Figure 3B:
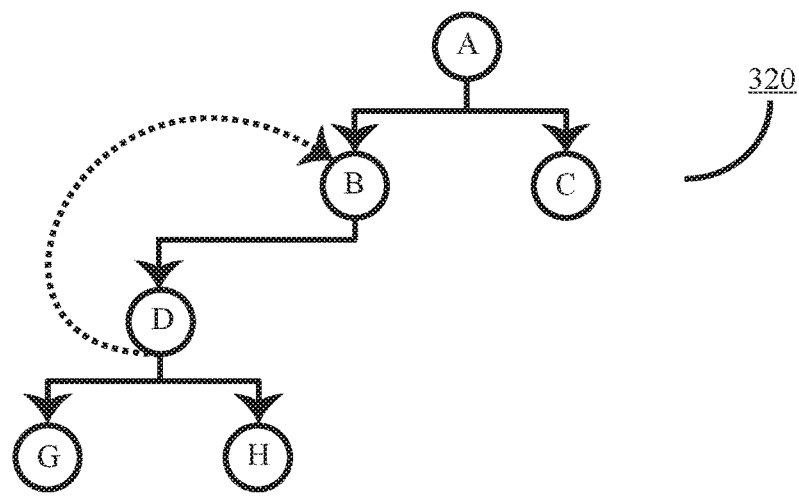
FIG. 3B illustrates an exemplary common set of search roots in accordance with one embodiment.
Figure 3C:
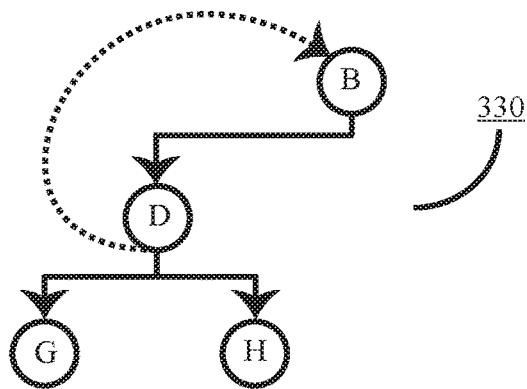
FIG. 3C illustrates an exemplary search root in accordance with one embodiment.

Referring now to FIGS. 3A-3C, identifying a common set of search roots 204 from a plurality of search requests is further explained by way of example. As an example, a complete directory tree 310 is schematically represented. The directory tree 310 of FIG. 3A is complete and contains nodes from (A)-(J). A is a directory that contains (B) and (C). (C) is a file. (B) is a directory that contains (D), (E), and (F). (E) is a file. (D) is directory that contains a link to (B), and files (G) and (H). Finally, (F) is a directory that contains files (I) and (J). In this example, two search requests are received.

Continuing with the example, a first request has a first search root of (A) with a first directory exclusion of (E) and (F). The first search root or the directory tree beginning with (A) is: (A)→[(B)→[(D)→[(G), (H)], (E), (F)→[(I), (J)]], (C)]. The first directory exclusion comprises (E) and (F) and is: [(E), (F)→[(I), (J)]]. These means that a single search based only on the first search request would require a first traversal 320 of: (A)→[(B)→[(D)→[(G), (H)], (C)]. The first traversal 320 is shown in FIG. 3B. A second search request has a second search root of (B) with a second directory exclusion of (E) and (F). The second search root or the directory tree beginning with (B) is: (B)→[(D)→[(G), (H)], (E), (F)→[(I), (J)]]. And, the second directory exclusion comprises (E) and (F) and is: [(E), (F)→[(I), (J)]]. A single search based only on the second search request would require a second traversal 330 of: (B)→[(D)→[(G), (H)]. The second traversal 330 is shown in FIG. 3C. It can be seen from FIGS. 3B-C that the first traversal 320 and second traversal 330 overlap. This overlap illustrates that two searches performed independently based upon these two search request would result a redundant traversal of the file system. In this example, the redundant traversal would occur over: (B)→[(D)→[(G), (H)]. The redundant traversal 330 may be schematically represented by FIG. 3C. A single file system often contains hundreds of thousands to millions of small files, and endpoint vulnerability searching often requires dozens to hundreds of successive file system searches. The number of redundant traversals and the costs in time and resources incurred as a result during endpoint vulnerability searching are manifold.

Instead of performing multiple searches as with traditional methods, the FSSP system 100 identifies a common set of search roots 204. Back to the example, the common set of search roots for the first search request and the second search request is a union of the first search root and the second search root absent an intersection of the first directory exclusion and the second directory exclusion. A resulting proxy search would therefore traverse a proxy search traversal 320, shown in FIG. 3B. And, unlike in traditional searching methods the proxy search traversal would be the only traversal of the file system. However, once a common set of search roots has been identified and multiple searches are being performed with fewer traversals (e.g. 1) of the file system, candidates must be mapped back to the correct search request.

According to some embodiments, a proxy search is performed and candidates that are located within the common set of search roots are returned as the file system is traversed. However, not every candidate is within the scope of each search request. In some versions, a windowing function is used to statelessly determine if a candidate can be mapped to a given search request. An example windowing function is constructed using direct acyclic word graphs (DAWGs). Performance of a windowing function is explained in reference to FIG. 3D.

Figure 3D:
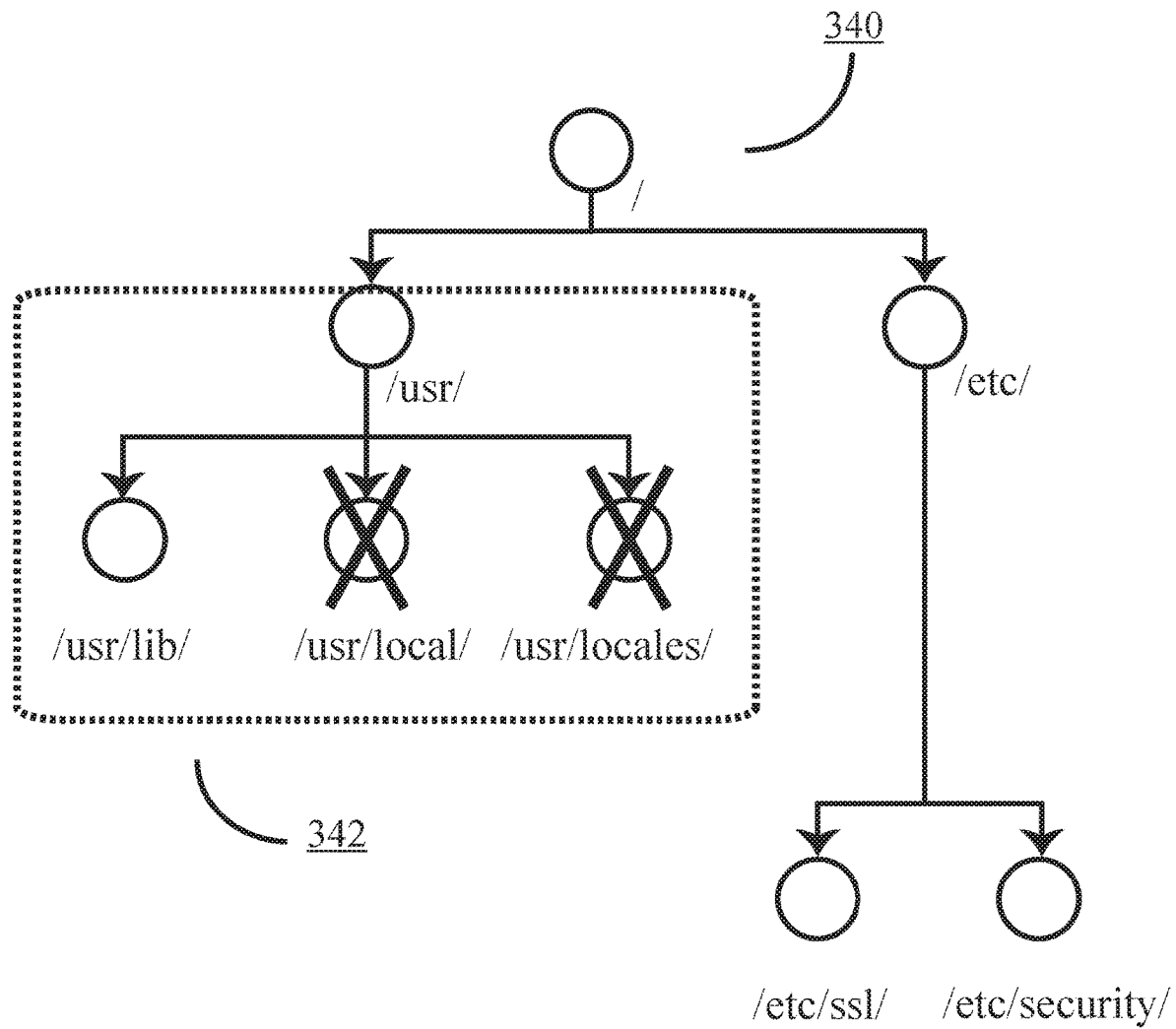
FIG. 3D schematically depicts a proxy search being demultiplexed according to some embodiments and FIG. 4 depicts a system for concurrently performing multiple file system searches in accordance with one embodiment.

FIG. 3D illustrates an exemplary directory tree 340 that is being traversed as part of a proxied search. Each of the nodes shown illustrates a directory. An example search request is being performed as part of the proxy search. The example search request includes a search root of '/usr/' and directory exclusions of '/usr/local/' and '/usr/locales/'. A windowing function is generated that tests whether a candidate belongs to a whitelist directory set 342 or a blacklist directory set. According to the example, the whitelist directory set includes /usr/ and the blacklist directory set includes '/usr/local/' and '/usr/locales/'. As candidate files are returned during the proxy search they are quickly evaluated against the windowing function. Continuing with our example, candidates '/usr/lib/libssl.dylib', '/usr/local/system/libsystem_c.dylib', and '/etc/openssl' are evaluated with the windowing function. The candidate '/usr/lib/libssl.dylib' is evaluated as belonging to the whitelist directory 342 and is therefore mapped with the example search request. The candidate '/usr/local/system/libsyste_c.dylib' is evaluated as belonging to the whitelist directory 342, however it is also evaluated as belonging to the blacklist directory ('/7usr/local/') and is therefore not mapped to the example search request. Finally, the candidate '/etc/openssl' is evaluated as not belonging to either the whitelist directory set 342 or the blacklist directory set and is also not mapped to the example search request.

Figure 4:
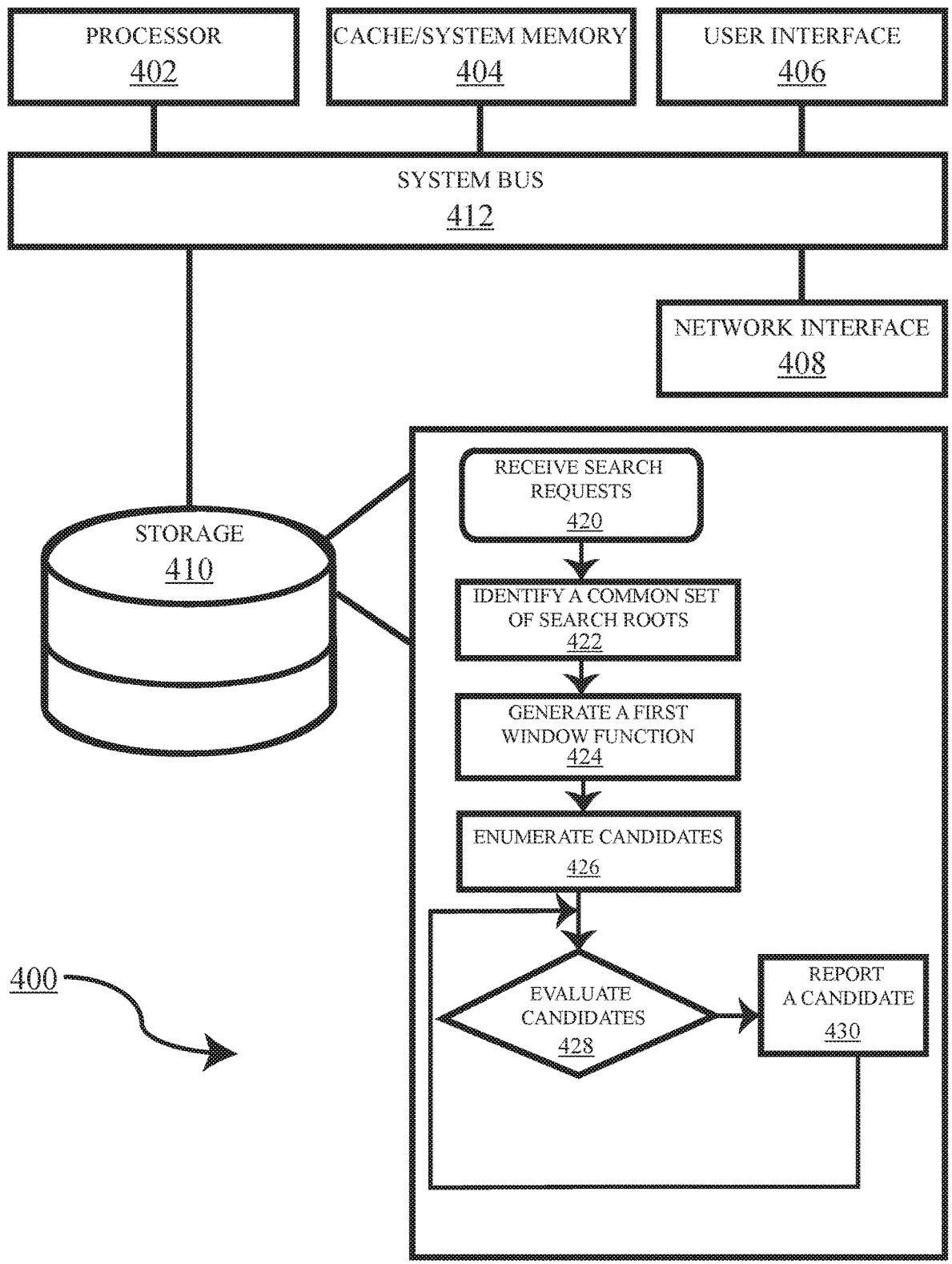

Referring now to FIG. 4, a system for concurrently performing multiple searches of a file system based on a plurality of search requests in accordance with one embodiment is shown. The system 400 may include a processor 402, memory 404, a user interface 406, a network interface 408, and storage 410, all interconnected via one or more system buses 412. It will be understood that FIG. 4 constitutes, in some respects, an abstraction and that the actual organization of the system 400 and the components thereof may differ from what is illustrated.

The processor 402 may be any hardware device capable of executing instructions stored on memory 404 and/or in storage 410, or otherwise any hardware device capable of processing data. As such, the processor 402 may include a microprocessor, field programmable gate array (FPGA), an application-specific integrated circuit (ASIC), or other similar devices.

The memory 404 may include various transient memories such as, for example L1, L2, or L3 cache or system memory. As such, the memory 404 may include static random access memory (SRAM), dynamic RAM (DRAM), flash memory, read only memory (ROM), or other similar memory devices and configurations.

The user interface 406 may include one or more devices for enabling communication with system operators and other personnel. For example, the user interface 406 may include a display, a mouse, and a keyboard for receiving user commands. In some embodiments, the user interface 406 may include a command line interface or graphical user interface that may be presented to a remote terminal via the network interface 406. The user interface 406 may execute on a user device such as a PC, laptop, tablet, mobile device, or the like, and may enable a user to provide the system 400 with a plurality of search request. Additionally, one or more user interfaces 406 may be used to report results of a proxy search 212.

The network interface 408 may include one or more devices for enabling communication with other remote devices to access an endpoint device for vulnerability searching. For example, the network interface 408 may include a network interface card (NIC) configured to communicate according to the Ethernet protocol. Additionally, the network interface 408 may implement a TCP/IP stack for communication according to the TCP/IP protocols. The system 400 may access an endpoint device via telnet, SSH, or another communication protocol. One or more search requests may be received 202 by the system by way of a network and the network interface 408. Additionally, reporting of search results 212 may be performed via the network interface 208. Various alternative or additional hardware or configurations for the network interface 408 will be apparent.

The storage 410 may include one or more machine-readable storage media such as read-only memory (ROM), random-access memory (RAM), magnetic disk storage media, optical storage media, flash-memory devices, or similar storage media. A file system which is the focus of a plurality of search requests may be located on the storage 410. In various embodiments, the storage 410 may store instructions for execution by the processor 402 or data upon which the processor 402 may operate. For example, the storage 410 may include instructions to receive a plurality of search requests 420, each search request comprising at least one search root; identify a common set of search roots 422 from the plurality of search roots; generate a first window function 424 based on a first search root belonging to the common set of search roots; enumerate candidates 426 located in a plurality of directory trees, each directory tree beginning in a search root in the common set of search roots; evaluate the candidates 428 based upon a first search criteria and the first window function; and report a result 430 from the candidates that satisfies both the first search criteria and the first window function.

According to some embodiments, the storage 410 may also include instructions to perform searches in non-common (i.e., non-coalesceable) search roots. In some cases, a non-coalesceable search request may have a search root that is not coalescable with a common set of search roots (i.e., a search root that does not contain an ascending or descending node, which is also contained in the common set of search roots). In this case, the non-coalesceable search request may not be performed concurrently with a proxy search. In order to perform a search in a non-coalesceable search root, the system 400 includes instructions to identify a non-common search root not belonging to the common set of search roots; enumerate non-common candidates located in a directory tree beginning in the non-common search root; evaluate the non-common candidates based upon a second search criteria; and report a second result from the non-common candidates that satisfies the second search criteria.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for concurrent performance of multiple searches of a single file system, the method comprising:
receiving a plurality of search requests of the single file system, each search request comprising at least one search root of the single file system;
identifying, using a configured processor, a common set of search roots from the plurality of search roots;
generating, using the configured processor, a first window function based on a first search root belonging to the common set of search roots, wherein the first window function filters candidates to determine if the candidates are responsive to the plurality of search requests;
enumerating, using the configured processor, candidates located in a plurality of directory trees, each directory tree beginning in a search root in the common set of search roots;
enumerating, using the configured processor, at least one attribute associated with each of the enumerated candidates, wherein the at least one enumerated attribute is based upon criteria from the plurality of search requests;
evaluating, using the configured processor, the candidates based upon a first search criteria, the enumerated at least one attribute, and the first window function; and
reporting, using the configured processor, a result from the candidates that satisfies the first search criteria, the enumerated at least one attribute, and the first window function.

2. The method of claim 1 further comprising:
identifying, using the configured processor, a non-common search root not belonging to the common set of search roots;
enumerating, using the configured processor, non-common candidates located in a directory tree beginning in the non-common search root;
evaluating, using the configured processor, the non-common candidates based upon a second search criteria; and
reporting, using the configured processor, a second result from the non-common candidates that satisfies the second search criteria.

3. The method of claim 1 wherein the common set of search roots comprises at least one search root that shares a common ascending node or a common descending node.

4. The method of claim 1 wherein the first window function comprises a pair of directed acyclic word graphs (DAWGs).

5. The method of claim 4 wherein the pair of DAWGs comprise:
a blacklist DAWG defining excluded nodes; and
a whitelist DAWG defining a set of search roots.

6. The method of claim 5 further comprising:
evaluating, using the configured processor, the candidates against the blacklist DAWG; and
evaluating, using the configured processor, the candidates against the whitelist DAWG.

7. The method of claim 1 wherein reporting the result comprises executing at least one of a callback handler and an asymmetric coroutine.

8. The method of claim 1, wherein each search request further comprises a set of directory exclusions, the method further comprising:
computing the intersection of the plurality of sets of directory exclusions; and
enumerating, using the configured processor, candidates located in the common set of search roots and not located in the computed intersection of the plurality of sets of directory exclusions.

9. The method of claim 1, wherein identifying the common set of search roots comprises removing interleaving search roots.

10. The method of claim 1, wherein each search request further comprises a set of directory exclusions, and wherein identifying the common set of search roots comprises removing search roots that are descendant nodes of a directory exclusion.

11. A system for concurrent performance of multiple searches of a single file system, the system comprising:
a configured processor configured to:
receive a plurality of search requests of the single file system, each search request comprising at least one search root of the single file system;
identify a common set of search roots from the plurality of search roots;
generate a first window function based on a first search root belonging to the common set of search roots, wherein the first window function filters candidates to determine if the candidates are responsive to the plurality of search requests;
enumerate candidates located in a plurality of directory trees, each directory tree beginning in a search root in the common set of search roots;
enumerate at least one attribute associated with each of the enumerated candidates, wherein the at least one enumerated attribute is based upon criteria from the plurality of search requests;
evaluate the candidates based upon a first search criteria, the at least one enumerated attribute,. and the first window function; and
report a result from the candidates that satisfies the first search criteria, the enumerated at least one attribute, and the first window function.

12. The system of claim 11 wherein the configured processor is further configured to:
identify a non-common search root not belonging to the common set of search roots;
enumerate the non-common candidates based upon a second search criteria; and
report a second result from the non-common candidates that satisfies the second search criteria.

13. The system of claim 11 wherein the common set of search roots comprises at least one search root that shares a common ascending node or a common descending node.

14. The system of claim 11 wherein the first window function comprises a pair of directed acyclic word graphs (DAWGs).

15. The system of claim 14 wherein the pair of DAWGs comprise:
a blacklist DAWG defining excluded nodes; and
a whitelist DAWG defining a set of search roots.

16. The system of claim 15 wherein the configured processor is further configured to:
evaluate the candidates against the blacklist DAWG; and
evaluate the candidates against the whitelist DAWG.

17. The system of claim 11 wherein the configured processor is configured to report the result in part by configurations to execute at least one of a callback handler and an asymmetric coroutine.

18. The system of claim 11 wherein each search request further comprises a set of directory exclusions; and the configured processor is further configured to:
compute the intersection of the plurality of sets of directory exclusions: and
enumerate candidates located in the common set of search roots and not located in the computed intersection of the plurality of sets of directory exclusions.

19. The system of claim 11, wherein the configured processor is configured to identify the common set of search roots in part by configurations to remove interleaving search roots.

20. The system of claim 11, wherein each search request further comprises a set of directory exclusions; and wherein the configured processor is configured to identify the common set of search roots in part by configurations to remove search roots that are descendant nodes of a directory exclusion from the common set of search roots.

* * * * *